(12) United States Patent
Mirsky et al.

(10) Patent No.: US 6,332,336 B1
(45) Date of Patent: *Dec. 25, 2001

(54) METHOD AND APPARATUS FOR MAXIMIZING THE PRODUCTIVITY OF A NATURAL GAS LIQUIDS PRODUCTION PLANT

(75) Inventors: Saul Mirsky; Boris Zilberman, both of West Des Moines, IA (US)

(73) Assignee: Compressor Controls Corporation, Des Moines, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,187

(22) Filed: Feb. 26, 1999

(51) Int. Cl.[7] .................................................. F25J 1/00
(52) U.S. Cl. ................................................ 62/613; 62/657
(58) Field of Search ............................ 62/613, 619, 628, 62/657

(56) References Cited

U.S. PATENT DOCUMENTS

| | | | |
|---|---|---|---|
| 4,281,970 | 8/1981 | Stewart et al. | 417/53 |
| 5,139,548 * | 8/1992 | Liu et al. | 62/657 |
| 5,791,160 * | 8/1998 | Mandler et al. | 62/657 |

* cited by examiner

Primary Examiner—Ronald Capossela
(74) Attorney, Agent, or Firm—Henderson & Sturm LLP

(57) ABSTRACT

An objective in a natural gas liquids (NGL) plant is that of achieving and maintaining maximum productivity. If this plant is equipped with a turboexpander that drives a gas compressor (recompressor), maximum turboexpander productivity provides maximum plant productivity attained by maximum compressor power. This is accomplished by manipulating the compressor operating point location (by adjusting the opening of the antisurge valve) and by controlling rotational speed. The subjects of the proposed invention are the method and apparatus (comprising a turboexpander/recompressor rotational speed controller and a recompressor antisurge controller) providing maximum turboexpander/recompressor rotational speed and recompressor operating point location (corresponding to maximum power) by opening the turboexpander's adjustable nozzles and the recompressor antisurge valve.

24 Claims, 4 Drawing Sheets

METHOD AND APPARATUS FOR MAXIMIZING THE PRODUCTIVITY OF A NATURAL GAS LIQUIDS PRODUCTION PLANT

TECHNICAL FIELD

This invention relates generally to a method and apparatus for maximizing the production rate of natural gas liquids (NGL) in a gas processing plant. More specifically, this invention relates to the control of a turboexpander that drives a recompressor, with the objective of maximizing NGL production.

BACKGROUND ART

Effective operation of natural gas liquids plants is restricted because turboexpander shaft rotational-speed limits restrict the unit from achieving maximum productivity. Achieving a high level of productivity is necessary because liquid high-molecular weight fractions are more valuable than the lighter gaseous components.

DISCLOSURE OF THE INVENTION

A purpose of this invention is to maximize the production rate of NGL in a gas processing plant by increasing the power that the turboexpander absorbs. This can be achieved at maximum rotational speed and with maximum opening of the turboexpander's adjustable nozzles by opening the recompressor's antisurge (hot recycle) valve or its cold recycle valve, or both of them. Valve opening must be limited to a preset value determined by a curve constructed on the recompressor's performance map. This curve is located such that moving the compressor's operating point from its surge limit line to the curve along a line of constant speed increases compressor power; and moving the compressor's operating point (from the above-mentioned curve) further to the right and along a line of constant speed decreases compressor power.

Compressor power in terms of compressor similarity parameters can be expressed $$\frac{J}{pN} = f\left(\frac{Q^2}{ZRT}, R_c\right) \quad (1)$$

where

J = compressor power
  p = absolute pressure (in suction or discharge)
  N = rotational speed
  Q = compressor volumetric flow
  Z = compressibility factor
  R = gas constant
  T = absolute temperature (in suction or discharge)
  $R_c$ = pressure ratio, $p_d/p_s$
  $p_d$ = absolute compressor discharge pressure
  $p_s$ = absolute compressor suction pressure Eq. (1) describes the surface on which the compressor's operating point resides. As in the case with the surge limit, any single curve in this three-dimensional space can be described by any two of these compressor similarity parameters; for instance, $$\frac{J}{pN} = f_1\left(\frac{Q^2}{ZRT}\right) \quad (2)$$

Using Eq. (2), compressor power must be known to determine which side of such a curve the operating point is on. When compressor power is unknown (as is often the case) the operating point location, relative to this curve, can be determined using another pair of similarity parameters, but not involving the power, J, such as $$R_c = f_2\left(\frac{Q^2}{ZRT}\right) \quad (3)$$

Therefore, adequate information must be available to calculate two similarity parameters; in this case, $R_c$ and $$\frac{Q^2}{ZRT} \propto \frac{\Delta p_o}{p}$$

where $\Delta p_o$ is a differential pressure across a flow measurement device. This information is all that is required to limit the compressor's operating point to a region to the left of the curve, as described by Eq. (3).

To maintain the operating point to one side of the curve of Eq. (3), a control action can be based on an error calculated as either of $$\epsilon = R_c - f_2\left(\frac{Q^2}{ZRT}\right)$$

or $$\epsilon = \frac{f_3(R_c)}{Q^2/ZRT} - 1$$

However, the invention is not limited to these forms of error calculation.

Maximum NGL production can be realized by two methods.

1. The turboexpander's adjustable nozzles together with the cold and hot recycle valves are manipulated as usual until rotational speed reaches its limiting set point, $N_{sp}$. At this time, the speed controller's output signal opens the cold recycle valve or the hot recycle valve (or both of them) until the recompressor's operating point reaches a preset maximum distance from the surge limit line. The turboexpander's adjustable nozzles are then manipulated to limit rotational speed, N. An advantage of this first method is that the cold recycle valve and the antisurge valve are closed (or minimally opened, when needed) before maximum rotational speed is reached. A disadvantage of the method is if the preset set point is incorrect, or becomes incorrect, a sudden increase in rotational speed may result when the productivity set point is changed to maximum.

2. Both the cold recycle controller and the hot recycle controller (whose set point may be slightly closer to the surge limit line than that of the cold recycle controller) open their corresponding valves to maintain maximum compressor power for the current rotational speed. When maximum turboexpander rotational speed is achieved, maximum plant productivity is also achieved. But when rotational speed is lower than maximum, the antisurge valve (hot recycle) or the cold recycle valve, or both of them, may be open when corresponding controllers operate in a RUN mode. An advantage of this second method is that incorrectness of the preset set point cannot result in sudden rotational speed increase; and the set point may be corrected for the recompressor's maximum power at any rotational speed.

BEST MODE FOR CARRYING OUT THE INVENTION

Figure 1A:
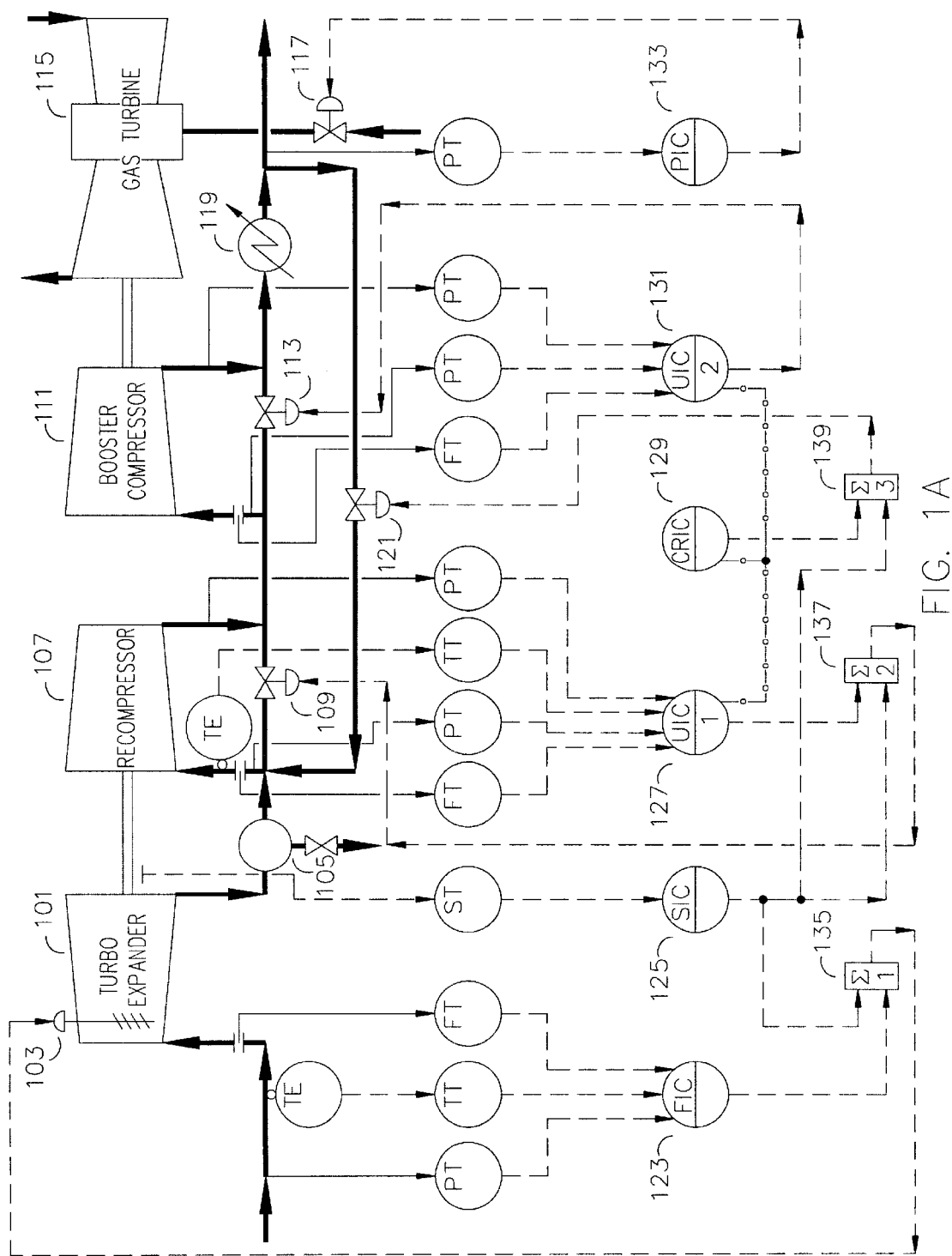
FIG. 1A shows a control system diagram of a turbomachinery train in a natural gas liquids (NGL) production plant.
Figure 1B:
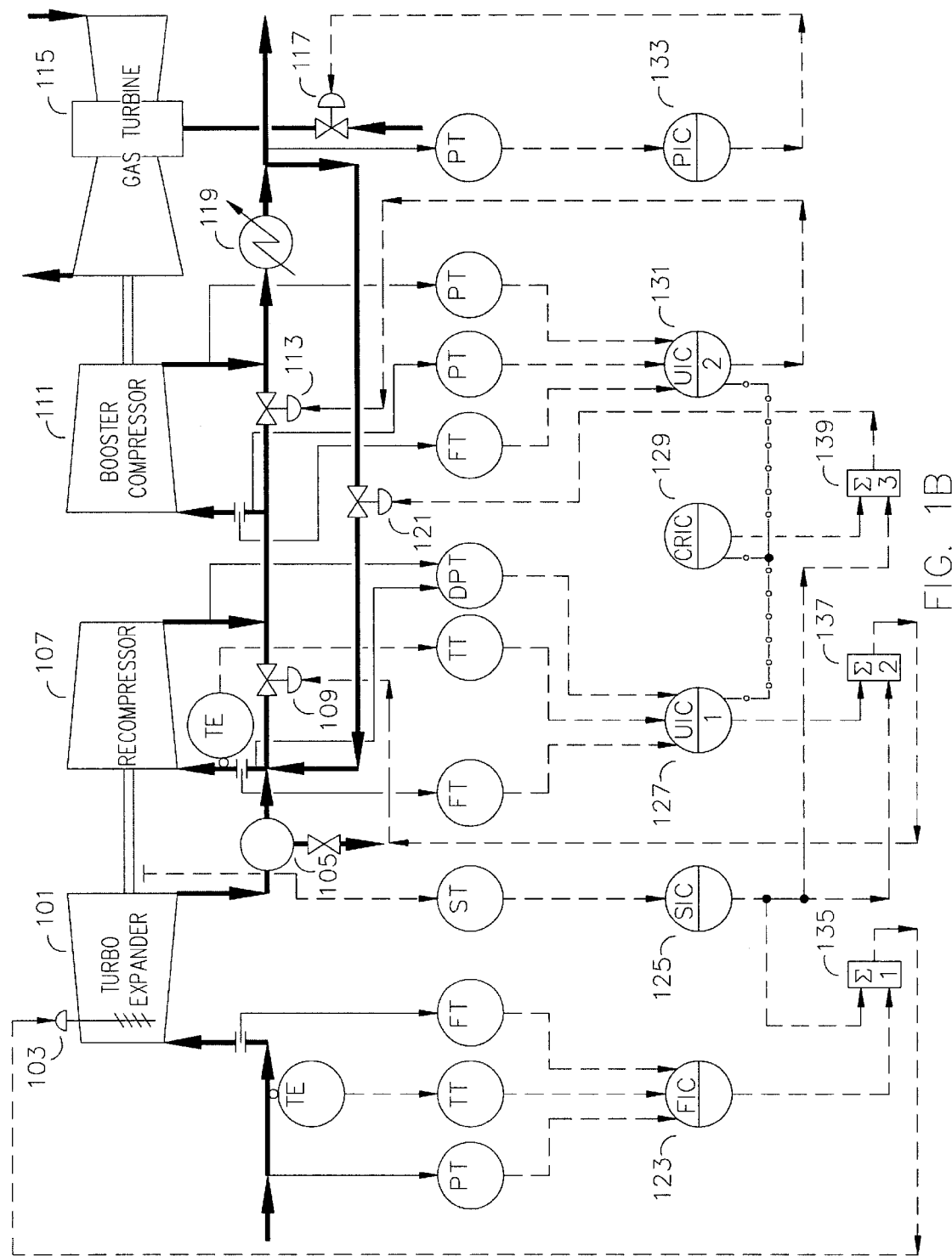
FIG. 1B shows a control system diagram similar to that of FIG. 1A, but featuring a recompressor's differential pressure transmitter (DPT) rather than two pressure transmitters (PT).

FIGS. 1A and 1B depict similar control system diagrams of a turbomachinery train used for natural gas liquids (NGL) separation. The train in each figure includes a turboexpander 101 with governed (adjustable) nozzles 103, a separator 105, a recompressor 107 having an antisurge (hot recycle) valve 109, a booster compressor 111 having an antisurge (hot recycle) valve 113, and a gas turbine 115 equipped with a fuel control valve 117. The booster compressor 111 discharges to the plant outlet piping by way of a gas cooler 119 which, in turn, connects to the recompressor 107 inlet through a cold recycle valve 121.

The turboexpander 101 and both compressors 107, 111 are each equipped with a control system that includes devices for monitoring process input signals, such as pressures in suction and discharge, temperatures, rotational speed, and differential pressure across flow measurement devices. These process signals are sent by various transmitters: pressure (PT), temperature (TT), rotational speed (ST), and pressure differential flow measurement (FT-$\Delta p_o$). The turbomachinery train shown in FIG. 1B includes the same transmitter types, but with the addition of a recompressor's differential pressure transmitter (DPT-$\Delta p_o$) rather than two pressure transmitters (PT).

System controllers (each equipped with a PID algorithm) consist of flow indicating (FIC) 123, speed indicating (SIC) 125, antisurge (UIC-1, 2) 127, 131, cold recycle indicating (CRIC) 129, and pressure indicating (PIC) 133. Several of these controllers input directly to three summation blocks ($\Sigma$-1, 2, 3) 135, 137, 139.

In carrying out the previously described first method where maximum mass flow is attained when the adjustable nozzles 103 are opened just as rotational speed reaches its limiting set point ($N_{sp}$), the apparatus operates in the following manner. Mass flow is maintained by adjustable nozzles 103, while plant discharge pressure is maintained by the booster compressor 111 driven by the gas turbine 115. Energy is removed from gas as it passes through the turboexpander 101; the gas then moves on to the separator 105 where high-molecular weight liquefied components are separated from the lighter gaseous components. Simultaneously, as the liquid level reaches a preset value, a separator level controller (not shown) opens a drain valve.

As the plant throughput set point is increased, the gas throughput controller (FIC) 123 opens the adjustable nozzles 103 by way of a summation block, $\Sigma$-1 135. Because of this action, gas throughput and rotational speed of the turboexpander 101 increase. Consequently, the booster compressor's 111 rotational speed and the plant outlet pressure both decrease. At this time, an outlet pressure controller (PIC) 133 opens the fuel control valve 117, thereby increasing the booster compressor's rotational speed and maintaining the plant outlet pressure equal to its set point.

If an operating point of either compressor 107, 111 achieves a set point of the CRIC controller 129 or of the two UIC controllers 127, 131, specific signals from these three controllers (mutually connected by a serial communication link and acting through $\Sigma$-3 139) open the cold recycle valve 121 first. But if this is not sufficient to maintain the operating conditions under control, they open both antisurge (hot recycle) valves 109, 113 by way of summation block $\Sigma$-2 137 and UIC-2 131, respectively.

Figure 3:
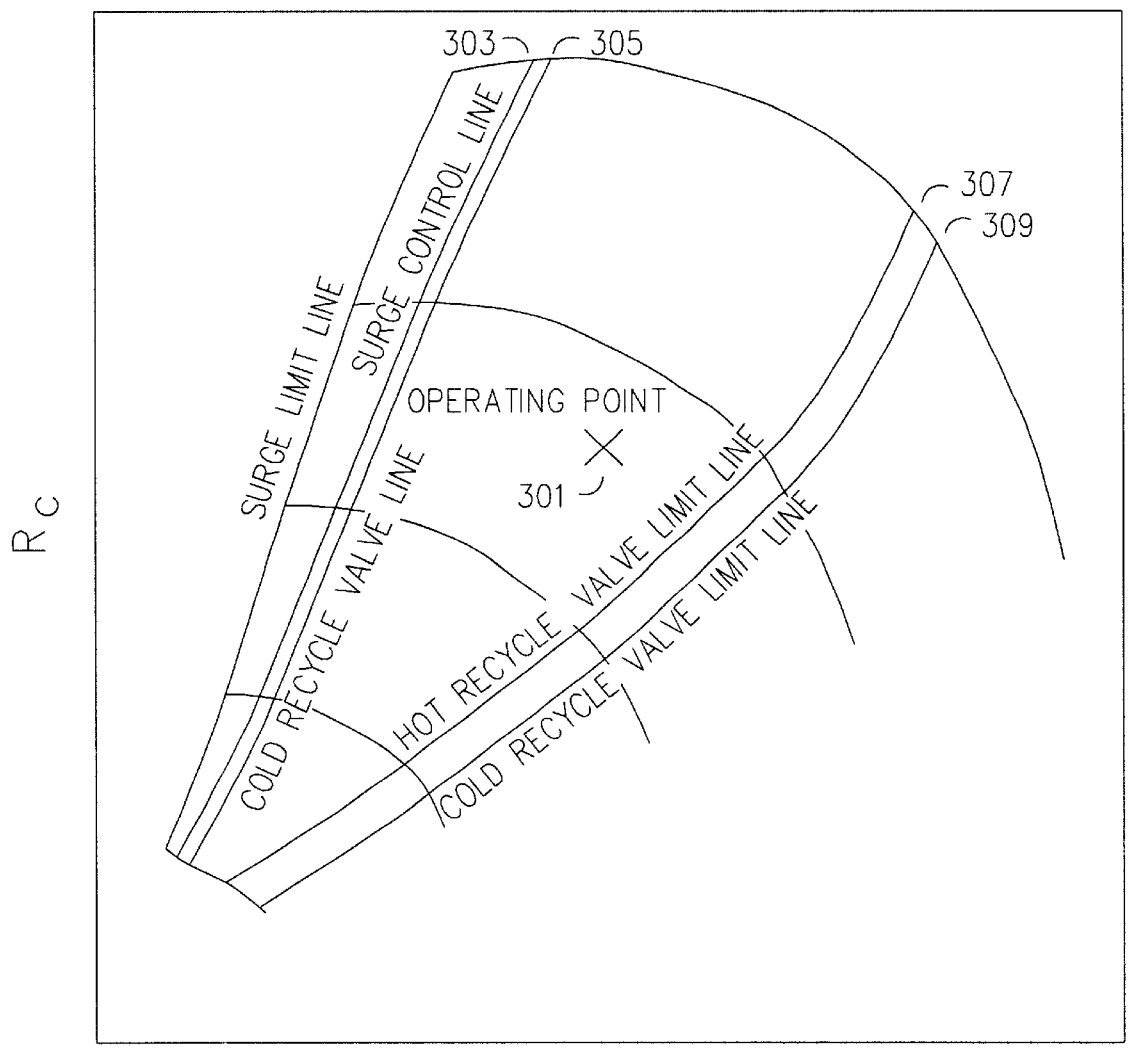
FIG. 3 shows a recompressor performance map in [$R_c$, Q/$\sqrt{ZRT}$] coordinates.

The UIC-1 controller 127 and the CRIC controller 129 are both designed to maintain a minimum flow. The UIC-1 controller 127 modulates the hot recycle valve 113 to keep the operating point 301 (see FIG. 3) to the right of the surge control line 303. The CRIC controller 129 modulates the cold recycle valve 121 to ensure that the operating point resides to the right of the cold recycle valve line 305. The action of the CRIC controller also permits the hot recycle valve 113 to be closed (for antisurge purposes) in steady state to protect the recompressor 107 from high temperatures. Under a hard disturbance, both the hot recycle valve 113 and the cold recycle valve 121 may be opened to protect the recompressor from surge.

An additional limiting loop is available in each of the two controllers, UIC-1 127 and CRIC 129. These limiting loops are high-flow limits. The UIC-1 high-flow limit is intended to maintain the operating point to the left of the hot recycle valve limit line 307 by limiting the hot recycle valve's 113 opening. The CRIC high-flow limit is intended to maintain the operating point to the left of the cold recycle valve limit line 309 by limiting the opening of the cold recycle valve 121. The relative positions of the hot and cold recycle valve limit lines 307, 309 ensures that the hot valve is closed first.

When the turboexpander's 101 rotational speed achieves the limiting set point ($N_{sp}$) of the rotational speed controller (SIC) 125, this controller opens the recompressor's hot recycle valve 109 by way of summation block $\Sigma$-2 137, or it opens the cold recycle valve 121 by way of summation block $\Sigma$-3 139, or both operations concurrently. Opening the hot recycle valve 109 and/or the cold recycle valve 121 increases recompressor 107 power and, in turn, limits the turboexpander's rotational speed. Both valves may also open in a given relationship to prevent an increase of the recompressor's 107 inlet temperature.

Figure 2:
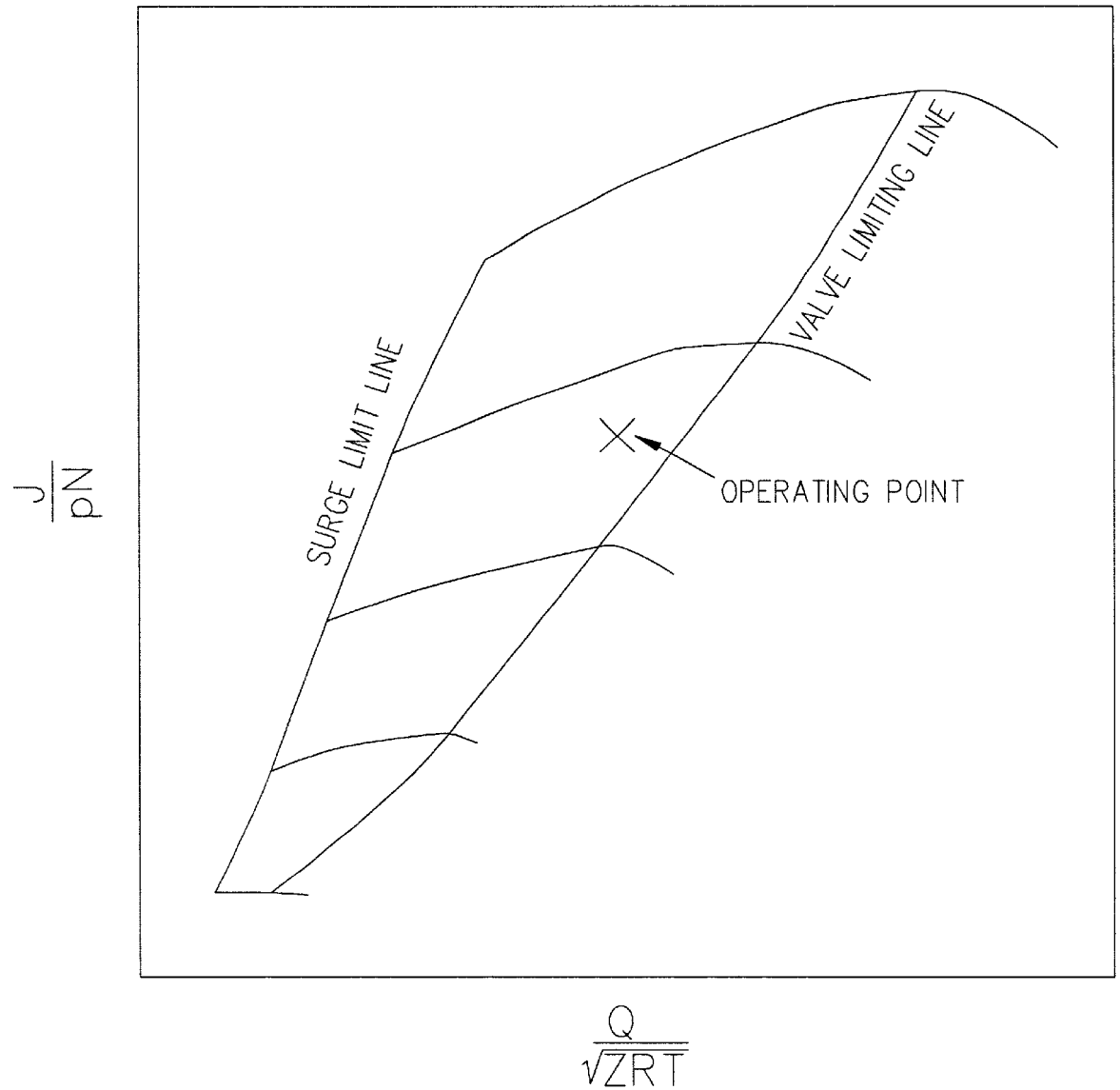
FIG. 2 shows a recompressor performance map in [J/(pN), Q/$\sqrt{ZRT}$] coordinates.

When the recompressor's 107 operating point reaches a corresponding high-flow limit, the UIC-1 controller 127 and the CRIC controller 129 (acting through summation blocks $\Sigma$-2, 3 137, 139) stop increasing their respective output signals, thereby preventing further opening of the hot recycle valve 109 and/or the cold recycle valve 121. Now the SIC controller 125 cannot open the hot recycle valve 109 and/or the cold recycle valve 121, and has to commence closing the adjustable nozzles 103 (acting through $\Sigma$-1 135) to limit the turboexpander's rotational speed. The reason behind this sequence is that further opening of the hot and/or cold recycle valves 109, 121 will not increase compressor power but, instead, will decrease power. This is shown in FIG. 2 where operation to the right of the curve labeled "Valve Limiting Line" will result in a decrease in compressor power with valve opening. Only the closing of the adjustable nozzles 103 can limit turboexpander rotational speed.

In carrying out the process by the previously described second method where both the cold recycle controller and the antisurge controller (whose set point may be slightly closer to the surge limit line) open corresponding valves to maintain maximum compressor power for the current rotational speed, the apparatus operates in the following manner. Summation blocks Σ-2, 3 137, 139 have zero multipliers on inputs from the SIC controller 125. Set points for the UIC-1 controller 127 and the CRIC controller 129 are adjusted to slightly different high-flow limit set points. The compressor's maximum-power operating condition is now maintained at any rotational speed by opening the cold recycle valve 121 and the recompressor's hot recycle valve 109, when needed. The high-flow set point of the UIC-1 controller is closer (as mentioned above) to the surge limit line than the high-flow set point of the CRIC controller; and the hot recycle valve 109 may be closed because the cold recycle valve 121 is sufficiently open and maintains the required compressor operating condition. The "Valve Limiting Line" shown in FIG. 2 is the "Hot Recycle Valve Limit Line" shown in FIG. 3. A coordinate transformation is performed to plot it in coordinates which include only information available from measurement devices around the compressor.

When compressor rotational speed achieves its maximum value, the compressor achieves its maximum power. It is to be noted that the CRIC controller 129 and the cold recycle valve 121 may be recognized, to some extent, as an antisurge controller and an antisurge valve, respectively.

Obviously, many modifications and variations of the present invention are possible in light of the above teachings. It is, therefore, to be understood that within the scope of the appended claims, the invention may be practiced otherwise than as specifically described.

We claim:

1. A method for maximizing the production of natural gas liquids (liquid high-molecular weight fractions) from natural gas using equipment comprising a turboexpander with adjustable nozzles, a recompressor, a turboexpander speed controller, a flow-rate control, a compressor antisurge controller, and a compressor antisurge valve, the method comprising:
   (a) measuring a rotational speed, N, of the turboexpander;
   (b) calculating a deviation, $N-N_{sp}$, of the turboexpander rotational speed, N, from a limiting set point, $N_{sp}$;
   (c) controlling the rotational speed of the turboexpander when the deviation is positive by modulating the compressor antisurge valve to return and maintain the deviation to a value less than or equal to zero; and
   (d) limiting the opening of the compressor antisurge valve when further opening results in a decrease in compressor power.

2. The method of claim 1, wherein determining the point at which further opening of the antisurge valve results in a decrease in compressor power, the steps comprising:
   (a) measuring appropriate parameters in the vicinity of the recompressor;
   (b) calculating a recompressor operating point location using the appropriate parameters; and
   (c) comparing the operating point location with a predetermined limit.

3. The method of claim 2, wherein opening of the antisurge valve is stopped when the operating point arrives at the predetermined limit.

4. The method of claim 2, wherein the appropriate parameters measured in the vicinity of the recompressor comprise:
   (a) a differential pressure, $\Delta p_o$, measured across a flow measurement device;
   (b) a suction pressure, $p_s$; and
   (c) a discharge pressure, $p_d$.

5. The method of claim 2, wherein the appropriate parameters measured in the vicinity of the recompressor comprise:
   (a) a differential pressure, $\Delta p_o$, measured across a flow measurement device; and
   (b) a differential pressure across the recompressor, $\Delta p_c$.

6. The method of claim 1, wherein the turboexpander's adjustable nozzles are also manipulated to maintain the rotational speed, N, less than or equal to the limiting set point, $N_{sp}$.

7. The method of claim 6, wherein the turboexpander's adjustable nozzles are manipulated to control the rotational speed under its limit when the antisurge valve opening is limited.

8. The method of claim 1, wherein the compressor antisurge valve is a cold recycle valve.

9. The method of claim 1, wherein the compressor antisurge valve is a hot recycle valve.

10. A method for maximizing the production of natural gas liquids (liquid high-molecular weight fractions) from natural gas using a recompressor having a compressor antisurge controller and a compressor antisurge valve, the method comprising:
    (a) measuring appropriate parameters in the vicinity of the recompressor;
    (b) determining a recompressor operating point location relative to a high-flow limit; and
    (c) using the relative location of the recompressor's operating point to the high-flow limit to modulate the compressor antisurge valve to maintain the location at a predetermined value.

11. The method of claim 10, wherein the antisurge valve is a cold recycle valve.

12. The method of claim 10, wherein the antisurge valve is a hot recycle valve.

13. An apparatus for maximizing the production of natural gas liquids (liquid high-molecular weight fractions) from natural gas using equipment comprising a turboexpander with adjustable nozzles, a recompressor, a turboexpander speed controller, a flow-rate control, a compressor antisurge controller, and a compressor antisurge valve, the apparatus comprising:
    (a) means for measuring a rotational speed, N, of the turboexpander;
    (b) means for calculating a deviation, $N-N_{sp}$, of the turboexpander rotational speed, N, from a limiting set point, $N_{sp}$;
    (c) means for controlling the rotational speed of the turboexpander when the deviation is positive by modulating the compressor antisurge valve to return and maintain the deviation to a value less than or equal to zero; and
    (d) means for limiting the opening of the compressor antisurge valve when further opening results in a decrease in compressor power.

14. The apparatus of claim 13, wherein determining the point at which further opening of the antisurge valve results in a decrease in compressor power comprises:
    (a) means for measuring appropriate parameters in the vicinity of the recompressor;

(b) means for calculating a recompressor operating point location using the appropriate parameters; and (c) means for comparing the operating point location with a predetermined limit.

15. The apparatus of claim 14, wherein opening of the antisurge valve is stopped when the operating point arrives at the predetermined limit.

16. The apparatus of claim 14, wherein the appropriate parameters measured in the vicinity of the recompressor comprise:

(a) a differential pressure, $\Delta p_o$, measured across a flow measurement device;

(b) a suction pressure, $p_s$; and (c) a discharge pressure, $p_d$.

17. The apparatus of claim 14, wherein the appropriate parameters measured in the vicinity of the recompressor comprise:

(a) a differential pressure, $\Delta p_o$, measured across a flow measurement device; and (b) a differential pressure across the recompressor, $\Delta p_c$.

18. The apparatus of claim 13, wherein the turboexpander's adjustable nozzles are also manipulated to maintain the rotational speed, N, less than or equal to the limit set point, $N_{sp}$.

19. The apparatus of claim 18, wherein the turboexpander's adjustable nozzles are manipulated to control the rotational speed under its limit when the antisurge valve opening is limited.

20. The apparatus of claim 13, wherein the compressor antisurge valve is a cold recycle valve.

21. The apparatus of claim 13, wherein the compressor antisurge valve is a hot recycle valve.

22. An apparatus for maximizing the production of natural gas liquids (liquid high-molecular weight fractions) from natural gas using a recompressor having a compressor antisurge controller and a compressor antisurge valve, the apparatus comprising:

(a) means for measuring appropriate parameters in the vicinity of the recompressor;

(b) means for determining a recompressor operating point location relative to a high-flow limit; and (c) means for using the relative location of the recompressor's operating point to the high-flow limit to modulate the compressor antisurge valve to maintain the location at a predetermined value.

23. The apparatus of claim 22, wherein the antisurge valve is a cold recycle valve.

24. The apparatus of claim 22, wherein the antisurge valve is a hot recycle valve.

* * * * *